United States Patent [19]

Dougherty et al.

[11] 4,439,813
[45] Mar. 27, 1984

[54] THIN FILM DISCRETE DECOUPLING CAPACITOR

[75] Inventors: William E. Dougherty; Irving Feinberg, both of Poughkeepsie; James N. Humenik; Alan Platt, both of Lagrangeville, all of N.Y.

[73] Assignee: IBM Corporation, Hopewell Junction, N.Y.

[21] Appl. No.: 285,650

[22] Filed: Jul. 21, 1981

[51] Int. Cl.³ .......................... H01G 4/10; H01G 1/14
[52] U.S. Cl. ..................................... 361/321; 29/25.42
[58] Field of Search ............... 361/321, 322, 307, 306, 361/312, 313; 174/52 FP; 29/25.42

[56] References Cited

U.S. PATENT DOCUMENTS

| | | | |
|---|---|---|---|
| 3,021,589 | 2/1962 | Weller | 361/307 X |
| 3,278,815 | 10/1966 | Booe | 361/307 X |
| 3,292,240 | 12/1966 | McNutt | 174/52 FP |
| 3,303,393 | 2/1967 | Hymes | 174/52 FP |
| 3,638,085 | 1/1972 | Tierman | 361/322 |
| 3,897,074 | 12/1974 | Heywang | 361/307 |
| 4,071,878 | 1/1978 | Stynes | 361/321 X |
| 4,104,697 | 8/1978 | Kendall | 361/306 |

Primary Examiner—Donald A. Griffin
Attorney, Agent, or Firm—Sughrue, Mion, Zinn, Macpeak & Seas

[57] ABSTRACT

A decoupling capacitor for mounting on an integrated circuit multi-layer ceramic. A bottom layer electrode, is evaporated or sputtered onto a carrier. A high dielectric layer is deposited followed by the upper metallurgy and a top isolating layer. Via holes are etched to respective electrode layers, BLM deposited thereon followed by solder balls. The electrode is mounted onto the substrate, solder balls face down in contact with a compatible footprint.

13 Claims, 11 Drawing Figures

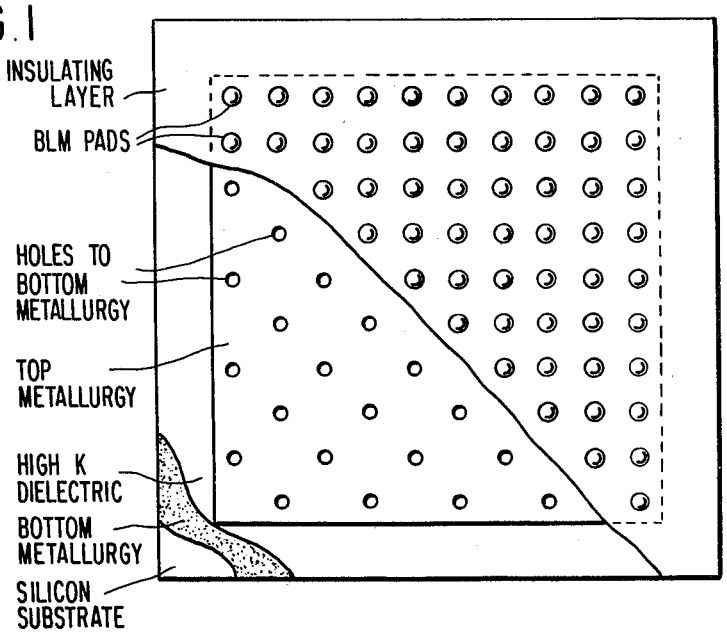
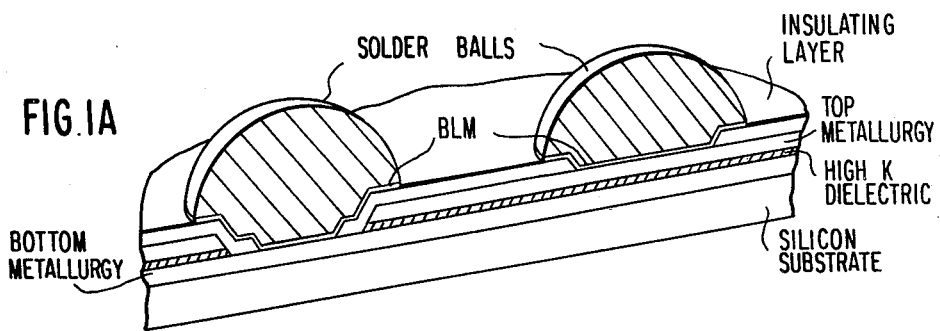
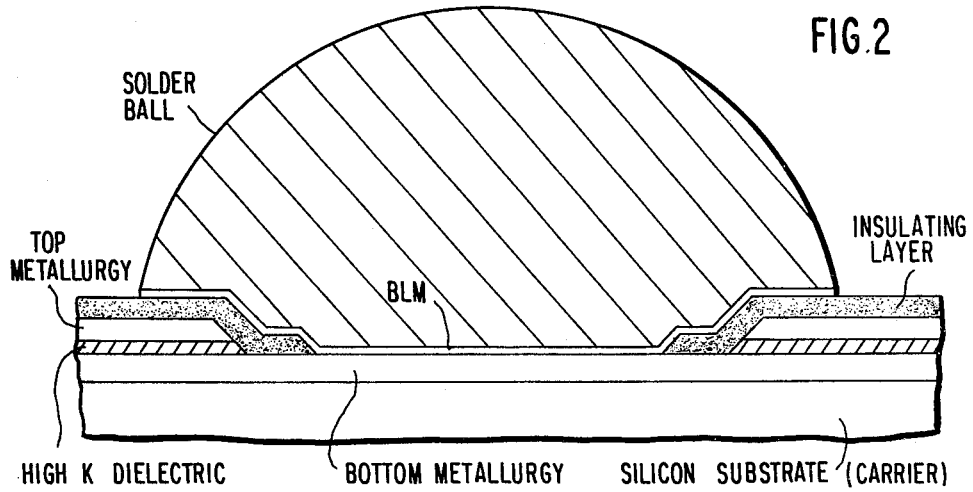

THIN FILM DISCRETE DECOUPLING CAPACITOR

BACKGROUND OF THE INVENTION

I. Field of the Invention

This invention relates to discrete decoupling capacitors utilized as components attached to the surface of a substrate for semi-conductors.

II. Prior Art

Multi-layer ceramic VLSI chip packaging substrates are formed by having a multiple number of flexible unfired sheets of soft ceramic material. These sheets, generally known as greensheets, have holes or vias punched into them in a known pattern. An electrically conductive paste is then screened through a metal mask to form personalized wiring patterns on the greensheet and to fill its via holes. A completed substrate is fabricated by stacking multiple greensheet layers that are pressed together to form a semi-hard stack or laminate which is then fired. The result is a substrate for VLSI chips.

On the substrate surface, an array of semiconductor chips are mounted with the substrate establishing all electrical connections within and between the chips. On the top surface of the substrate, each chip site is composed of an array of chip contact vias (C4 pads or microsockets). Disposed around each chip site is an area on the substrate for engineering changes, i.e., for wire connections to cure correctable defects in the chip or substrate.

Advanced semiconductor circuits employ decoupling capacitors. The decoupling capacitors are charged independent of circuit operation and are discharged to deliver via the substrate redistribution layer a current that enables fast transition circuit switching with a minimum noise. The elements are conventionally mounted on a circuit board, some distance away from the chip. One desired technique would be the use of a decoupling capacitor as a discrete component that is attached to the surface of the substrate. Closer physical location allows for and is essential for higher switching speeds of the chip. If utilized in that manner, not only is the capacitance of the component important, but additionally, its inductance is crucial to overall performance. The inductance of a discrete capacitor is directly proportional to the number of interconnections between it and the chip-carrying substrate. The larger number of bonds is desirable and results in a lower inductance. Moreover, the closer to the logic chip the capacitor is placed, the lower the inductance.

While a large number of prior art discrete capacitor devices are known, none is believed to be directly pertinent to discrete very low inductance capacitors where the substrate itself contains integrated wiring patterns. None is believed to be pertinent to discrete decoupling capacitors utilized on a support structure that is a multilayer ceramic having a pattern of conductive wires embedded therein and a multitude of throughhole vias at discrete chip site locations. Prior art thin film capacitors mounted on circuit boards are shown in references such as U.S. Pat. Nos. 3,819,990 and 4,158,218. Techniques of circuit board assembly which may utilize insulative substrates and electrical components including capacitors are typified by U.S. Pat. Nos. 4,139,881 and 4,164,778. Techniques of aligning discrete elements on a substrate are discussed in U.S. Pat. No. 3,811,186. None of the prior art, however, relates to a discrete chip capacitor utilizing pad connections on the substrate and employing thin film processes to match dimensionally, mechanically, and electrically, those facets of the substrate to which the capacitor is joined.

SUMMARY OF THE INVENTION

Given the deficiencies in the prior art, it is an object of this invention to define a discrete decoupling capacitor attached to the surface of a substrate for an integrated circuit.

A further object of this invention is to define a capacitor design offering low inductance, simplicity, and dimensional compatibility with VLSI packaging techniques.

Yet another object of this invention is to define a discrete component capacitor of extreme small size dimensionally applicable for mounting on integrated circuit substrates.

A further object of this invention is to provide a decoupling capacitor utilized on ceramic and other suitable substrates (e.g. alumina, glass-ceramic, etc.).

These and other objects of this invention are accomplished by a method of producing and, the substantive chip capacitor formed on a carrier. A bottom electrode layer is formed by evaporation or sputtering onto the carrier surface. A dielectric layer is then formed by sputtering directly onto the bottom conductive layer. A typical dielectric material is lead lanthanium zirconate titanate (PLZT). A top conductive layer is then deposited onto the dielectric layer followed by an insulating layer such as sputtered quartz, polyimide, etc. Ball limiting metalization (BLM) is then used to limit the spread of the conductive solder ball. An array of solder balls is used to establish multiple contact to the mounting pad thereby lowering the inductance of the capacitor.

The discrete capacitor itself utilizes two sets of via holes, the first set extending through the insulating layer to expose the top conductive layer and, a second set extending through the insulating layer, the top conductive layer, and the dielectric layer to expose the bottom conductive layer. The isolated solder mounds are deposited on the insulating layer over each via hole to provide electrical continuity between the capacitor mounting location at the chip site and the conductive layers.

This invention will be described in greater detail by referring to the accompanying drawings when taken with the description of the preferred embodiment which follows.

BRIEF DESCRIPTION OF THE DRAWINGS

FIG. 1 is a cutaway view of a discrete capacitor made in accordance with the present invention;

FIG. 1A is a cut away perspective view of the capacitor of FIG. 1;

FIG. 2 is a cross-section of the capacitor of FIG. 1 showing a through-via coupling to the bottom metallurgy;

DESCRIPTION OF THE PREFERRED EMBODIMENT

Figure 3A:
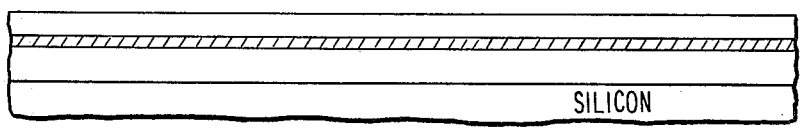
FIGS. 3A to 3E are schematic drawings showing the steps.
Figure 3B:
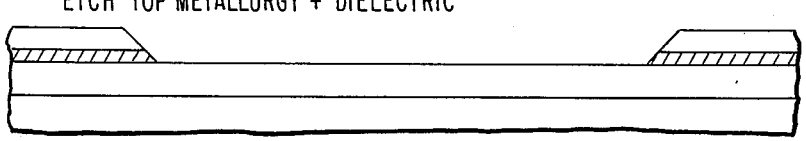

Referring now to FIG. 1A, a cutaway perspective view of the discrete capacitor in accordance with the present invention is shown. The capacitor is mounted on a silicon carrier since this material is amenable to thin film processing. The carrier is electrically inactive and accordingly, wafers not meeting electrical specifications for normal Si chips can be used as carriers for the capacitor in accordance with this invention. It is apparent, however, that glass, glass-ceramic or ceramic carriers having proper surface preparation can also be used for the base of the present capacitor. Moreover, the capacitor can be built by layering directly on a bottom metallurgy without any support or carrier structure.

FIGS. 1 and 1A show successive layers forming this invention. Deposited on a silicon carrier is the bottom metallurgy forming the bottom electrode. This layer is evaporated or sputtered onto the carrier surface with the choice of material being dependent on the type of material used to form the next layer, the dielectric layer. For example, if the dielectric layer is hot sputtered or subsequently heat treated, a high temperature metallurgy, such as Ti/W or Ta is used to form the bottom metallurgy layer. If, for example, mere sputtering of a dielectric layer is followed by no heat treatment, then, conventional bottom metallurgy, such as Cu or Al may be utilized.

Deposited on top of the bottom metallurgy layer is a high dielectric constant layer. This layer is sputtered directly onto the bottom metallurgy. The choice of the dielectric material requires an optimization of the thickness and the dielectric constant of the layer. Dielectrics of a dielectric constant K=15 can be used to achieve acceptable capacitances. However, they must be applied very thin which presents voltage breakdown problems. For example, if a film having K=30 is utilized, the thickness would equal 1000 Å to provide 10.5 nF when made into a capacitor of square size having a side of approximately 2032 μm with spacing between BLM pads in a range of 200 μm.

A typical material satisfying this requirement is lead lanthanum zirconate titanate (PLZT) in the amorphous or as-sputtered state. If a film of this material is properly heat-treated in the range of 600°–700° C., or, is hot sputtered, its K can reach values in the order of 500. It is apparent that with so high a value of K, the thickness of the dielectric film can be substantially increased to improve its reliability and voltage breakdown. Another material that can be employed for the dielectric layer is BaTiO$_3$.

Deposited on top of the High K dielectric layer is the upper metallurgy which is evaporated onto the surface after heat treatment, if required. Choices of metal include Al or Cu. It is apparent that any other suitable material known in the technology may be used. An insulating layer such as quartz (SiO$_2$) is then sputtered on top of the upper metallurgy to isolate the top plate from the bottom electrode.

In accordance with this invention, ball limiting metallurgy pads BLM are positioned in a regular array to limit the spread of each solder ball. Materials common to Si chip fabrication such as Cr/Cu/Au may be utilized and as will be delineated, BLM techniques are well established in the art.

An important aspect of this invention is the facet of utilizing a through via to provide a hole for establishing electrical contact from the top surface having the BLM pad to the bottom metallurgy layer. Accordingly, by subsequent placement of solder balls on the BLM pads, electrical contact with the top and bottom metallurgy is established. The solder balls mount to a similar footprint on the substrate establishing a very low inductance coupling.

Referring now to FIGS. 2 and 3, the steps of fabrication to establish a through-via to the bottom metallurgy are shown together with the resulting structure having a solder ball placed over the through-via. FIG. 3A shows the initial deposition of top and bottom metallurgy separated by the dielectric material. Typical dimensions are 3 μm for the bottom metallurgy, 2 μm for the top metallurgy, and, dielectric layer in the range of 0.5–1.0 μm. Half of the couplings must be to the bottom electrode and these are achieved by means of etching shown in FIGS. 3B–3D to achieve a through-via. FIG. 3B shows the first step of etching away the top metallurgy and the dielectric utilizing photolithographic techniques. Preferably, different etchants are utilized. These process techniques are well known in the technology. As shown in FIG. 3B, the bottom electrode is exposed by this etching step. An electrically insulting material such as quartz is then applied over the entire capacitor surface as shown in FIG. 3C. Typically, deposition achieves a layer in the range of 3 μm. As shown in FIG. 3D, again utilizing photolithographic techniques and a proper selective etchant, the bottom electrode is again exposed by etching the insulation. This etching step isolates the top electrode from the bottom electrode utilizing the insulation as the isolating layer.

Figure 3C:
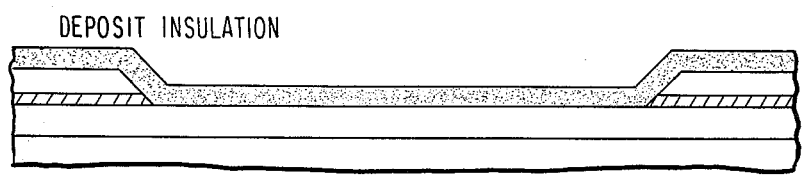
Figure 3D:
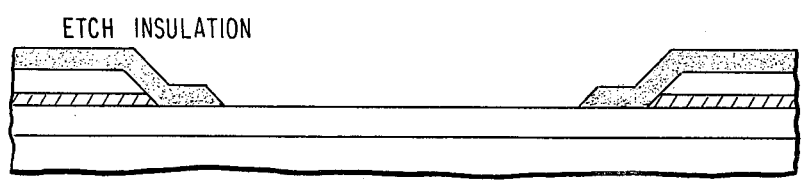
Figure 3E:
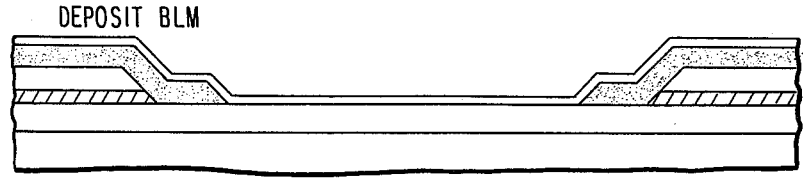

The final step shown in FIG. 3E is the deposition of the BLM metallurgy utilizing conventional materials and techniques as defined herein. A typical layer of BLM is in the range of 1 μm. As shown in FIG. 2, a solder ball is placed on top of the BLM. Accordingly, electrical continuity is achieved to the bottom metallurgy. The use of solder pads employing the solder ball shown in FIG. 2 has been the subject of investigations to achieve reliable connections of optimum geometric shape. Reference is made to "Reliability of Controlled Collapse Interconnections", K. C. Norris et al, *IBM J. Res. Develop.*, May, 1969, pages 266–271; "Controlled Collapse Reflow Chip Joining", L. F. Miller, *IBM J. Res. Develop.*, May, 1969, pages 239–250; "Geometric Optimization of Controlled Collapse Interconnections", L. S. Goldmann, *IBM J. Res. Develop.*, May, 1969, pages 251–265; and "Calculation of Droplet Profiles from Closed-Formed Solution of Young Laplace Equation", T. C. Ku et al, *IBM J. Res. Develop.*, November, 1968, pages 441–447 and of which typify reports of work in this area.

In achieving the cross-section of the through-via shown in FIG. 2, for use on a very thin substrate, the ultimate through-via connection may have typically a diameter in the range of 36 μm with the solder ball having a diameter across the BLM in the range of 74 μm. The BLM, with appropriate solder volume, controls solder ball size such that it is compatible with footprint connections.

Figure 4A:
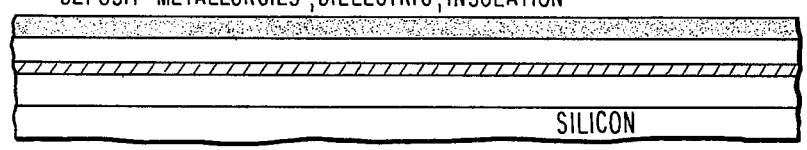
FIGS. 4A to 4C are schematic drawings showing the process.
Figure 4B:
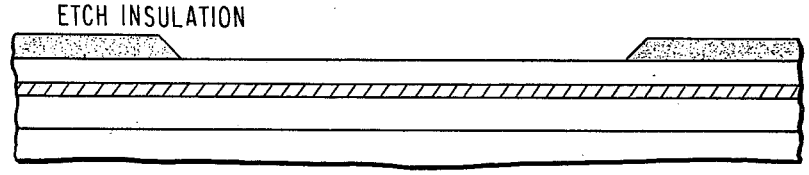
Figure 4C:
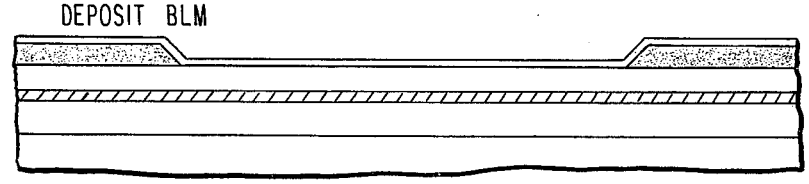

Referring now to FIG. 4, the steps of forming the top surface connections are shown. As in the case of achieving a through-via to the bottom metallurgy, the top layer, dielectric layer, and bottom metallurgy layer are first deposited onto the carrier. In FIG. 4A, the next step, deposition of the insulation is shown. This is the same step as shown in FIG. 3C. FIG. 4B shows etching of the insulation in a manner compatible with that shown in FIG. 3D. The subsequent step, deposition of the BLM is also compatible with that shown in FIG. 3E. It is apparent that etching of the insulating layer in FIG. 4B exposes only the top electrode.

Referring back to FIG. 1, the complete capacitor structure is shown. A border is provided about the capacitor structure BLM pad area to prevent smearing of the top and bottom metallurgy layers during dicing. The capacitors are formed on a large wafer and when all process steps are complete, the structure is cut or "diced" to provide for individual elements. The border establishes the area for cutting without slicing into the substantive layers.

It is apparent, therefore, that a discrete capacitor utilized on very thin carriers is defined by this invention. Mounting directly on the surface of a multi-layer ceramic substrate (e.g. alumina, glass-ceramic, etc.) is achieved such that a discrete decoupling capacitor is used in conjunction with integrated circuitry provided on the substrate. By employing multiple contacts on the footprint with the solder balls, very low inductance results. That is, the capacitor is mounted with the solder balls face down, in contact with a compatible pad footprint at a location on the substrate surface. Preferably the capacitor is mounted as electronically close as possible to the chip.

It is apparent that modifications of this invention in terms of the materials used or the physical structure may be contemplated as being within the scope of this invention. For example, although a 10×10 array of BLM pads (and resulting solder balls is shown), the array may be modified to conform with substrate design by eliminating a number of solder balls. However, maximizing the number of contacts lowers the inductance of the device. A different array configuration may also be used. Also, the metal electrodes may be segmented to divide the capacitor couplings into discrete areas. This allows isolation in the case of a short circuit condition at one portion. It also provides the flexibility to establish multi-voltage levels.

We claim:

1. A chip capacitor comprising:
    a bottom conductive layer having sequentially coated thereon
    a dielectric layer,
    a top conductive layer, and
    an insulating layer; first and second via holes, wherein:
    said first via holes extend through said insulating layer to expose said top conductive layer, and
    said second via holes extend through said insulating, top conductive, and dielectric layers to expose said bottom conductive layer with said insulating layer extending about the side walls of said top conductor layer in said second via holes to insulate said top conductive layer; and
    isolated solder mounds selectively deposited on said insulating layer over and in via holes in electric contact with an exposed conductive layer therein.

2. The chip capacitor of claim 1 further comprising a carrier substrate for mounting said bottom conductive layer.

3. The chip capacitor of claim 2, wherein said carrier is silicon.

4. The chip capacitor of claims 1 or 2, wherein said capacitor is mounted on a support surface for semiconductor chips.

5. The capacitor of claim 1 further comprising contact promoting metallurgy between each joined solder mound and an exposed conductive layer portion.

6. The capacitor of claim 5, wherein said bottom conductive layer comprises Ti/W or Ta; said dielectric layer comprises lead lanthanum zirconate titanate (PLZT), said top conductive layer comprises Al or Cu, and said insulating layer comprises quartz or $SiO_2$.

7. The capacitor of claim 1, wherein said chip is solder bonded to circuit containing a support or ceramic substrate.

8. The structure of claim 7, wherein said support structure is a multilayered ceramic having a conductive wiring pattern embedded therein.

9. A method of making a discrete thin film capacitor comprising the steps of:
    successively depositing a bottom conductive layer, a dielectric layer and a top conductive layer on an area of a carrier substrate,
    etching a portion of said top conductive layer and said dielectric layer to expose said bottom conductive layer,
    depositing a layer of insulating material over said etched portion and unetched areas,
    etching said insulating material to expose said top conductive layer at selected portions of said unetched area and to isolate said top conductive layer from said bottom conductive layer while exposing said bottom conductive layer, and
    depositing a layer of ball limiting metallurgy over all exposed portions.

10. The method of claim 9, wherein the step of depositing a bottom layer and a dielectric layer comprises sputtering or evaporating said bottom layer directly on said carrier and sputtering said dielectric layer directly on said bottom layer.

11. The method of claim 10, further comprising the step of evaporating a metal selected from the group consisting of Al or Cu directly onto the dielectric layer to form said top layer.

12. The method of claim 9, further comprising the steps of placing a solder ball over selected layers of said ball limiting metallurgy to define elective contacts with said top and bottom conductive layers and, cutting the resulting capacitor to size for mounting on an integrated circuit laminate.

13. The method of claim 9 wherein said insulating material is quartz.

* * * * *